United States Patent
Becher et al.

(10) Patent No.: US 8,070,335 B2
(45) Date of Patent: Dec. 6, 2011

(54) FIXTURE FOR A HEADLIGHT UNIT, METHOD FOR THE PRODUCTION THEREOF, AND FRONT UNIT

(75) Inventors: Harald Becher, Reichertshofen (DE); Pascal Joly-Pottuz, Lenting (DE)

(73) Assignee: Faurecia Kunststoffe Automobilsysteme GmbH, Ingolstadt (DE)

( * ) Notice: Subject to any disclaimer, the term of this patent is extended or adjusted under 35 U.S.C. 154(b) by 431 days.

(21) Appl. No.: 12/376,265

(22) PCT Filed: Aug. 6, 2007

(86) PCT No.: PCT/EP2007/058135
§ 371 (c)(1),
(2), (4) Date: Feb. 19, 2009

(87) PCT Pub. No.: WO2008/022904
PCT Pub. Date: Feb. 28, 2008

(65) Prior Publication Data
US 2010/0007176 A1    Jan. 14, 2010

(30) Foreign Application Priority Data

Aug. 24, 2006    (DE) .......................... 10 2006 039 627

(51) Int. Cl.
*B60Q 1/072* (2006.01)
*F21V 15/04* (2006.01)
*F21V 21/14* (2006.01)

(52) U.S. Cl. ... 362/507; 362/390; 362/549; 296/193.09; 296/203.02

(58) Field of Classification Search .................. 362/507, 362/369, 390, 549; 296/193.09, 203.02
See application file for complete search history.

(56) References Cited

U.S. PATENT DOCUMENTS

| | | | | | |
|---|---|---|---|---|---|
| 4,380,099 | A | * | 4/1983 | Dick et al. ..................... | 362/549 |
| 4,475,148 | A | * | 10/1984 | Tomforde ..................... | 362/549 |
| 6,135,619 | A | * | 10/2000 | Donaire Camacho et al. ............................. | 362/549 |
| 6,471,386 | B2 | * | 10/2002 | Oh ................................ | 362/549 |

(Continued)

FOREIGN PATENT DOCUMENTS

DE    19647928 A1    5/1998
(Continued)

OTHER PUBLICATIONS

Valeo Vision, "Fixation of an Equipment Part on an Element of the Vehicle Body Structure", Mar. 19, 2003, EPO-Espacenet, English translation of EP 1293379 A1, description 3 pages.*

(Continued)

*Primary Examiner* — Alan Cariaso
(74) *Attorney, Agent, or Firm* — Martin Fleit; Paul D. Bianco; Fleit Gibbons Gutman Bongini & Bianco

(57) ABSTRACT

The invention relates to a fixture for a headlight unit, comprising fastening means (105) for attaching the fixture to a support part (102) of a front unit of a motor vehicle, a reception zone (106) for the headlight unit, and first and second spaced-apart elastic means (112, 114) between the fastening means and the reception zone. The reception zone extends between the first and second elastic means which are embodied such that the reception zone for the headlight unit can be translationally moved substantially perpendicular to the direction of travel of the motor vehicle in order to mount the fixture into a motor vehicle.

8 Claims, 3 Drawing Sheets

U.S. PATENT DOCUMENTS

| | | | |
|---|---|---|---|
| 7,410,209 B2 * | 8/2008 | Clapie | 296/193.09 |
| 7,607,723 B2 * | 10/2009 | Bierjon et al. | 296/203.02 |
| 2002/0117875 A1 * | 8/2002 | Hoffner et al. | 296/194 |

FOREIGN PATENT DOCUMENTS

| | | |
|---|---|---|
| DE | 19946995 A1 | 4/2000 |
| DE | 102004057678 A1 | 6/2006 |
| DE | 102005013107 B3 | 7/2006 |
| EP | 0945330 A2 | 9/1999 |
| EP | 1036730 A2 | 9/2000 |
| EP | 1232932 A1 | 8/2002 |
| EP | 1 293 379 A1 | 3/2003 |
| EP | 1634800 A1 | 3/2006 |
| FR | 2783774 A1 | 3/2000 |
| FR | 2809061 A1 | 11/2001 |
| JP | 2002274252 A | 9/2002 |

OTHER PUBLICATIONS

International Search Report published Feb. 28, 2008 for PCT/EP2007/058135 filed Aug. 6, 2007.

English Translation of International Preliminary Report on Patentability published Mar. 17, 2009 for PCT/EP2007/058135 filed Aug. 6, 2007.

English Translation of Written Opinion published Mar. 12, 2009 for PCT/EP2007/058135 filed Aug. 6, 2007.

* cited by examiner

FIXTURE FOR A HEADLIGHT UNIT, METHOD FOR THE PRODUCTION THEREOF, AND FRONT UNIT

FIELD OF THE INVENTION

The invention relates to a fixture for a headlight unit, a method for the production thereof, and a front unit for a motor vehicle.

BACKGROUND OF THE INVENTION

A support for the front unit of a motor vehicle is known from EP 1 232 932 A1, is comprising a support part that connects to the mud guards and chassis frame of a motor vehicle. Attached to the support part is a lamp holder part that receives a headlight unit and connects to a bumper. In order to facilitate assembly and improve the gap formation, arranged on the headlight unit is a positioning pin that is guided into a corresponding opening on the mud guard bank.

Additional similar front units are known from FR 2 809 061 A1, DE 199 46 995 A1, DE 196 47 928 A1, EP 0 945 330 A2, EP 1 036 730 A2, DE 10 2004 057 678 A1 and DE 10 2005 013 107 B3.

JP 2002-274252 presents a fixture for a headlight unit of a motor vehicle. The headlight unit has a fastening means for attaching the fixture to a support part of a front unit of a motor vehicle. The fastening means is essentially formed by a hinge, to which the fixture is coupled and which is fixed to the support part by means of screw connections. In this sense, the hinge can be regarded as a first elastic or flexible means. The fixture also has a second means embodied in an elastic manner and spaced apart from the first elastic means and also a reception zone for the headlight unit. In this connection, the reception zone extends between the first and second elastic means.

EP 1 634 800 A1 presents a front unit for a motor vehicle comprising a bumper and a headlight unit, wherein a support has a reception zone for the headlight unit and also has a fastening means for attaching the support to a support part of a front unit of a motor vehicle. In this connection, the support is embodied so as to be elastic; the support has, in particular, a flexible zone that can be embodied in the form of a cavity.

In contrast, the problem of the invention is to create an improved fixture for a headlight unit and a method for the production thereof, and also a front unit with such a fixture.

SUMMARY OF THE INVENTION

The underlying problems of the invention are respectively solved by the features of the independent claims. Preferred embodiments of the invention are indicated in the dependent claims.

The invention creates a fixture for a headlight unit that enables tolerance compensation during installation of the front unit. This can improve the so-called gap formation, particularly with regard to the gaps between the bumper and headlight unit and between the headlight unit and the hood.

Of particular advantage in this connection are the spaced-apart elastic means between the fastening means and the reception zone for the headlight unit; these provide for an increased stability of the fixture and simultaneously preserve a tolerance-compensating ability. This is particularly advantageous in order to avoid so-called headlight rattle that otherwise can arise, particularly for headlights having a center of gravity located relatively far toward the rear.

According to one embodiment of the invention, the first and second elastic means are embodied such that the reception zone for the headlight unit can be translationally moved essentially perpendicular to the direction of travel of the motor vehicle in order to mount the fixture into a motor vehicle.

This creates an ability to compensate tolerances in a horizontal direction, particularly in the y-direction, which permits even a fixture for a headlight unit having greater manufacturing tolerances to be mounted in a motor vehicle. Lastly, cost-effective fixtures can also thus be realized; this is due to the reduction in the number of rejected fixtures owing to the permissibility of greater production tolerances.

Furthermore, a translational mobility of the reception zone in contrast to, for example, a rotatable movement of the reception zone relative to the fixture, assures that no readjustment of a mounted headlight unit will be necessary in order to assure that the headlight unit is also actually in alignment with the direction of travel of the motor vehicle.

According to one embodiment of the invention, the two elastic means have curved progressions in opposing directions. Preferably, the front elastic means has a curved progression toward the front, whereas the back elastic means has a curved progression toward the rear. This simultaneously creates a large measure of stability for the headlight unit and a tolerance-compensating ability. However, other curved progressions are also possible, particularly curved progressions that run essentially in the same direction.

According to one embodiment of the invention, the two elastic means form a bellows-shaped zone, which can be deformed by means of traction or compression during installation, in order to thus create a tolerance compensation in the horizontal, i.e., y-direction.

According to one embodiment of the invention, the fixture is produced by a plastic injection molding process. In this connection, the wall thickness in the zone of the elastic means is selected in a manner that enables deformation during installation for the purpose of compensating tolerances.

According to one embodiment of the invention, the fixture has a positioning pin for installation to a mudguard bank of the motor vehicle. The positioning pin is arranged, with regard to the elastic means, on the other side of the reception zone.

According to one embodiment of the invention, the headlight unit to be received by means of the reception zone has a center of gravity located relatively far toward the rear in the x-direction. The reception zone is configured so as to extend toward the rear essentially up to the x-coordinate of the center of gravity or beyond.

According to one embodiment of the invention, the reception zone is configured such that the base of the headlight unit is essentially completely overlapped by the reception zone. The reception zone thus is large enough for the base of the headlight unit to be essentially completely enclosed by the reception zone. It therefore is assured that a headlight rattle is transmitted to the reception zone and thus can be compensated by the first and second elastic means. Headlight rattle is thus minimized or eliminated entirely.

In another aspect, the invention relates to a method for the production of a fixture for a headlight unit by means of plastic injection molding. Preferably, the front elastic means is curved toward the front and the back elastic means is curved toward the rear, making it possible to easily remove the fixture from the plastic injection molding tool without a slide.

In another aspect, the invention relates to a front unit for a motor vehicle having a support part and a fixture according to the invention.

BRIEF DESCRIPTION OF THE DRAWINGS

In the following, embodiments of the invention are explained upon with reference to the drawings. Shown are.

Corresponding elements in the following figure descriptions are characterized in each case with identical reference numbers.

DETAILED DESCRIPTION OF THE INVENTION

Figure 1:
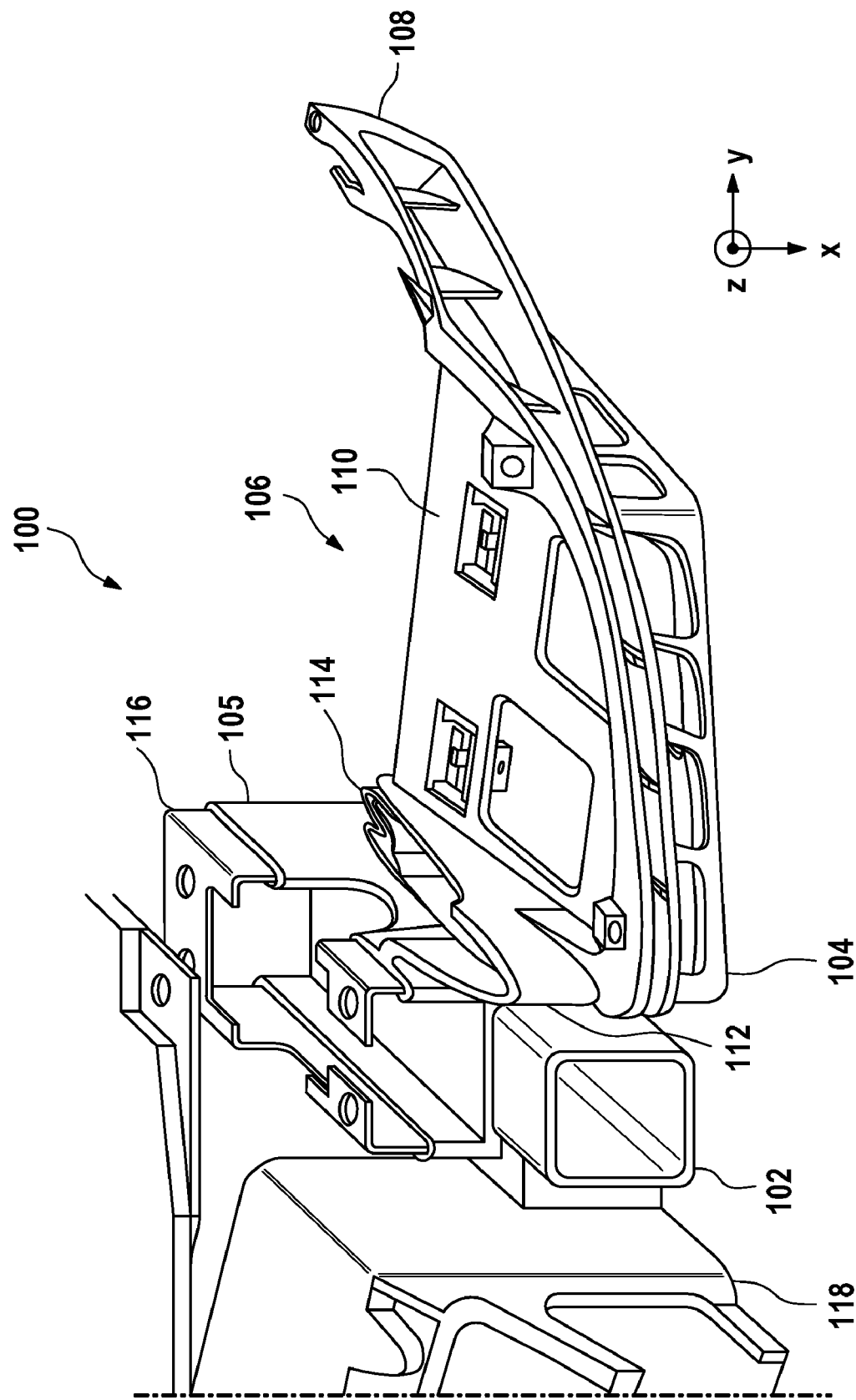
FIG. 1 A perspective view of a first embodiment of a fixture according to the invention, FIG. 2 A top view of another embodiment of a fixture according to the invention, FIG. 3 A detail in perspective view from the embodiment of FIG. 2.

FIG. 1 shows a support 100 of a front unit of a motor vehicle. The support 100 has a support part 102. The support part 102 is composed of a steel or aluminum profile.

A fixture 104 for a headlight unit (not represented in FIG. 1) is attached to support part 102. Serving this purpose are fastening means 105, which in the embodiment considered here are arranged on the support part 102 and are securely connected to the support part 102, for example, by means of a screw connection.

The fixture 104 has a reception zone 106 for the headlight unit. The front of the reception zone 106 is delimited by a retaining clip 108. Emanating from the retaining clip is a reception plane 110. For installation, the headlight unit is positioned in the reception zone 106 defined by the retaining clip 108 and reception plane 110 and fixed there, for example, by means of snap-action connections.

The reception zone 106 is connected to the fastening means 105 by means of elastic means 112 and 115 [sic; 114]. The elastic means 112, arranged to the front in the x-direction of the motor vehicle, has a wall in the z-direction that has a curved progression toward the front in the x/y plane. The elastic means 114 is formed, in turn, by means of a wall in the z-direction that has a curved progression toward the rear in the x/y plane. Owing to this, the two crowns of the curvatures of the elastic means 112 and 114 are spaced apart from each other by the maximum amount.

The elastic means 112 and 114 are composed of a plastic, with the wall thickness of the walls selected such that a deformation can occur by means of traction or compression on the fixture 104 in the y-direction. This enables tolerance compensation during assembly.

For example, the fixture 104 is produced as a plastic injection molded piece comprising the fastening means 105, reception zone 106, retaining clip 108, reception plane 110 and also the elastic means 112 and 114. In the embodiment considered here, the fixture 104 has a metallic insert 116 in the zone of the fastening means 105. The insert 116 can be used to form, for example, a lock retainer.

The reception zone 106 for the headlight unit and particularly the reception plane 110 extends essentially between the front elastic element 112 and the back elastic element 114. The two spaced-apart elastic means 112 and 114 are used to reinforce the stability of the reception zone 106 in the z-direction, thereby preserving the flexibility in the y-direction. Owing to the enhanced stability, headlight rattle during operation of the motor vehicle is lessened or avoided entirely, while nevertheless maintaining an ability to compensate tolerances in the y-direction during installation of the front unit. Preferably the reception plane 110 extends toward the rear at least up to the center of gravity of the headlight unit in order to inhibit headlight rattle as completely as possible.

Presented to the left in FIG. 1, next to the support part 102, are additional assemblies 118, such as, for example, ventilation channels and cooling water channels.

Figure 2:
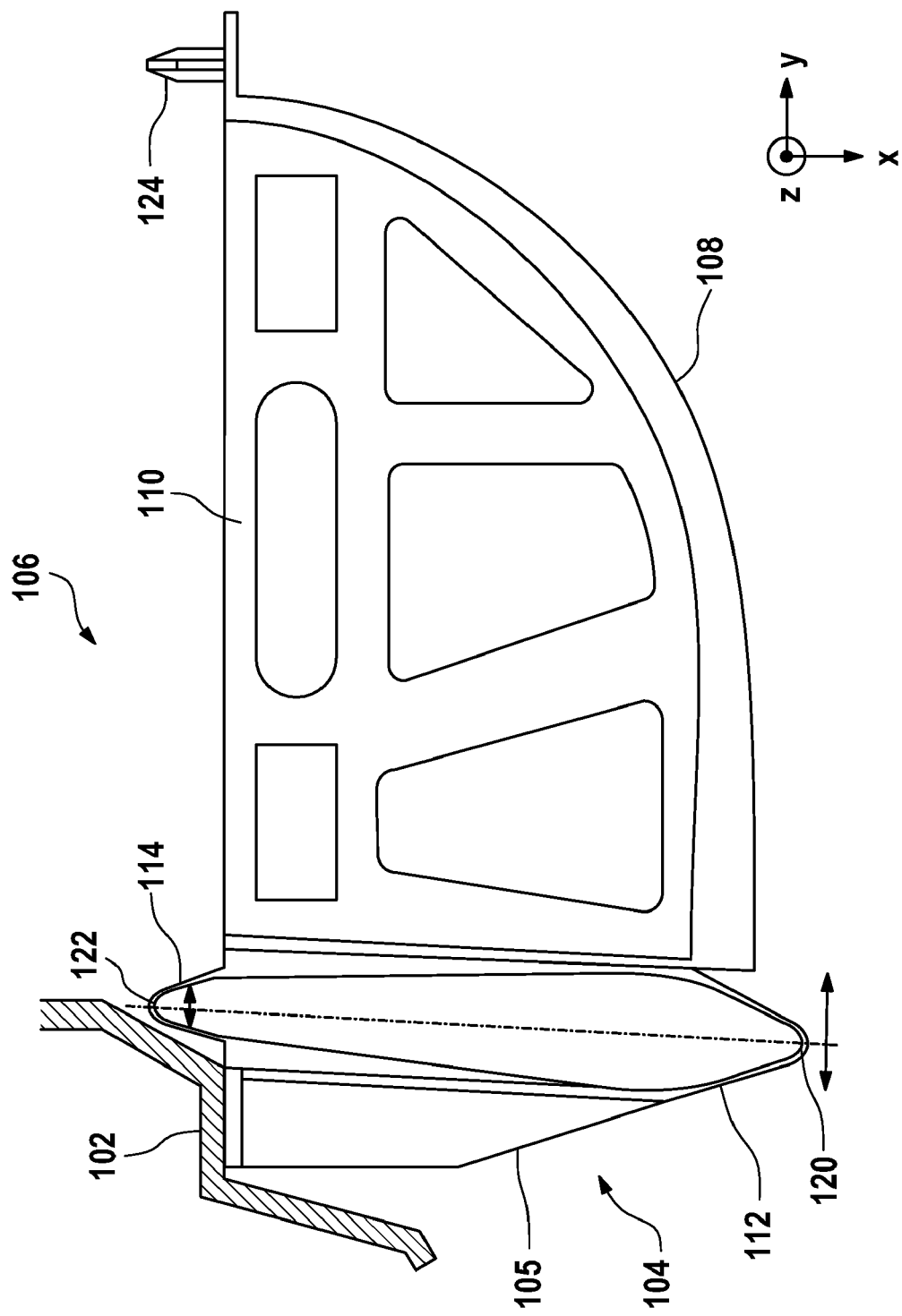

FIG. 2 presents another embodiment of a fixture 104 according to the invention. The reception zone 106 formed by the reception plane 110 and retaining clip 108 is connected by means of the elastic means 112 and 114 to the fastening means 105. The fixture 104 is attached to the support part 102 with the aid of the fastening means 105.

The elastic means 112 and 114 are respectively formed by means of a wall in the z-direction. In this connection, the front elastic means 112 is curved toward the front, and the back elastic means 114 toward the rear. The respective crowns 120 and 122 of the elastic means 112 and 114, arising due to the curvatures, are located opposite each other and, indeed, approximately on the x-axis. During installation, the elastic means 112 and 114 can be stretched or compressed about the respective crown 120 or 122, thus enabling a tolerance compensation with regard to the amount the reception zone 106 is spaced apart from the support part 102 in the y-direction.

In this connection, it is of particular advantage that the clearance between the crowns 120 and 122 is greater than the extension of the reception plane 110 in the x-direction. This provides for maximum stability and thus for a secure prevention of headlight rattle.

Arranged on the end of the retaining clip 108 located away from the fastening means 105 is a positioning pin 124. During installation, the positioning pin 124 is introduced into an installation hole in the mud guard bank of the motor vehicle. This establishes the position of the reception zone 106 in the y-direction, and the tolerance compensation required for this is created by expanding or compressing the bellows-shaped zone formed by the elastic means 112 and 114, which connect the fastening means 105 to the reception zone 106.

Figure 3:
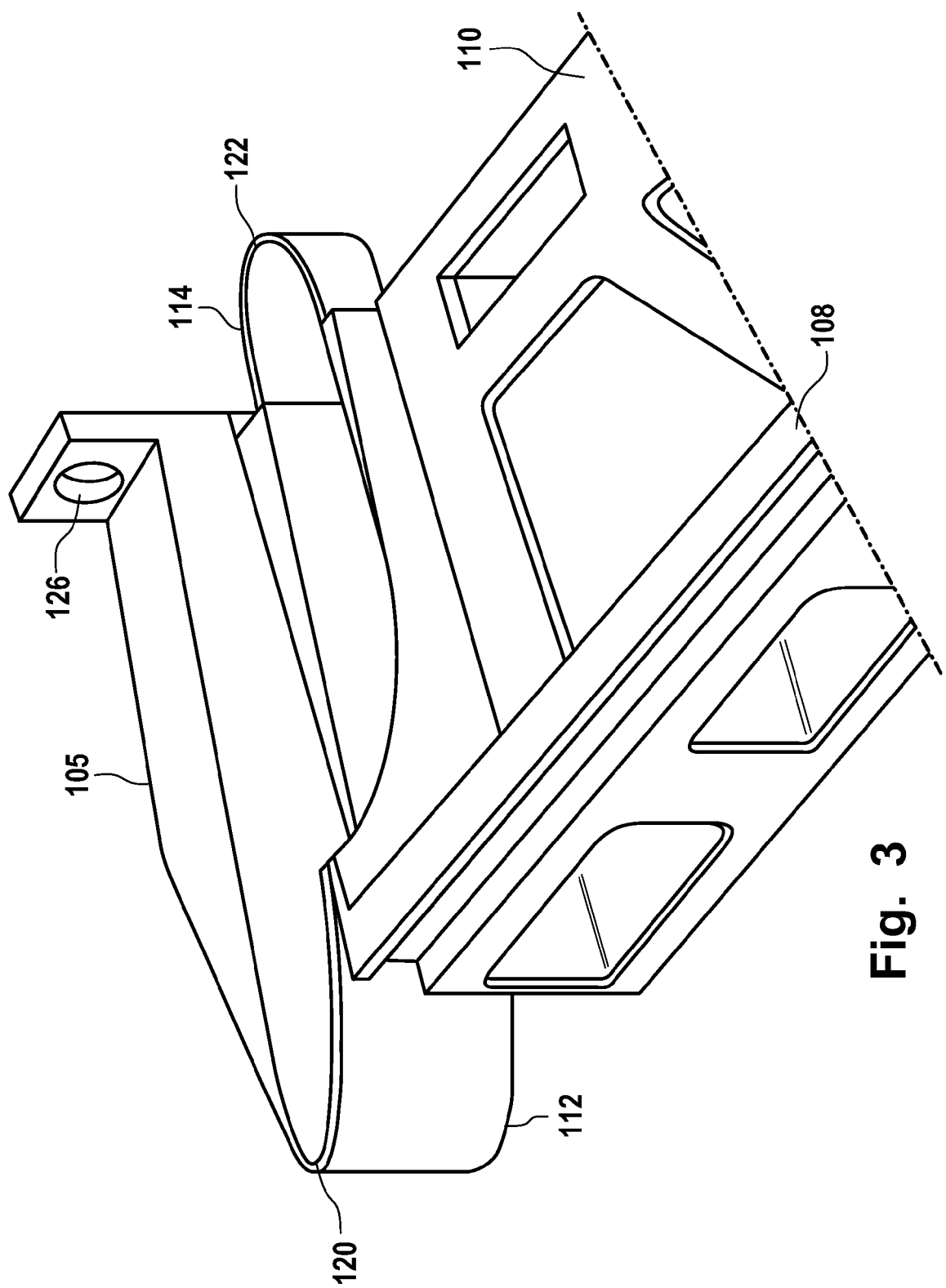

FIG. 3 presents the embodiment of FIG. 2 in a perspective view. As depicted in FIG. 3, the fastening means 105 has a hole 126 for a screw connection to the support part 102. The upper area of the retaining clip 108 is embodied in the form of a rail in order to receive a bumper cover.

LIST OF REFERENCE NUMBERS

100 Support
102 Support part
104 Fixture
105 Fastening means
106 Reception zone
108 Retaining clip
110 Reception plane
112 Elastic means
114 Elastic means
116 Insert
118 Assemblies
120 Crown
122 Crown
124 Positioning pin
126 Hole

The invention claimed is:

1. Fixture for a headlight unit comprising:
   a. fastening means for attaching the fixture to a support part of a front unit of a motor vehicle;
   b. a reception zone for the headlight unit;
   c. first and second spaced-apart elastic means between the fastening means and the reception zone;
   d. wherein the reception zone extends between the first and second elastic means that are embodied such that the reception zone for the headlight unit can be translationally moved essentially perpendicular to the direction of travel of the motor vehicle in order to mount the fixture into a motor vehicle;
e. wherein the first and second elastic means have curved progressions in opposing directions; and
f. wherein the first elastic means is arranged at a front boundary of the reception zone and the second elastic means is arranged at a rear boundary of the reception zone and wherein the first elastic means is curved toward the front and the second elastic means is curved toward the rear.

2. Fixture according to claim 1, wherein the first and second elastic means enable a relative movement between the fastening means and the reception zone in a horizontal direction in order to compensate tolerances.

3. Fixture according to claim 1, wherein the first and second elastic means form a bellows-shaped area.

4. Fixture according to claim 1, wherein the first and second elastic means are respectively formed by means of a wall with a wall thickness that enables deformation in order to compensate tolerances.

5. Fixture according to claim 1, with a positioning pin for installation of the fixture to a mud guard bank, wherein the positioning pin is arranged, with regard to the elastic means, on the other side of the reception zone.

6. Fixture according to claim 1, wherein the reception zone extends toward the rear as far as to center of gravity of the headlight unit.

7. Fixture according to claim 1 comprised of a plastic material.

8. Front unit of a motor vehicle with a support part and a fixture according to claim 1 fastened thereto.

* * * * *